Patented May 11, 1948

2,441,129

UNITED STATES PATENT OFFICE 2,441,129

BILE ACID DERIVATIVES OF ARYL SULFONAMIDES

Arpad Berczeller, New York, N. Y.

No Drawing. Application May 23, 1942, Serial No. 444,261

2 Claims. (Cl. 260—397.1)

The present invention relates to new and improved derivatives of aryl-sulfonamides, and more particularly, of p-amino benzene sulfonamides and to their method of preparation.

My invention has for its general object the production of bile acid derivatives of aryl-sulfonamides, and especially the N'-derivatives which, for want of a better term, I shall refer to hereinafter as the p-amino benzene sulfon-bile acylamides.

By the expression "bile acids" I include the various known acids whose salts are present in various animal biles, and also related acids of more or less synthetic origin having the fat-emulsifying and surface tension-diminishing properties of the true bile acids. Among these acids may be mentioned cholic, desoxycholic, chenodesoxycholic, lithocholic, dehydrocholic, and other cholanic acids. Of these acids, dehydrocholic acid appears to have the lowest toxicity and the derivatives of this acid are accordingly at present preferred by me.

The bile of animals has been employed in the culture of various bacteria and viruses, such as the tubercle bacillus, and yellow fever, typhus and dengue viruses, for the purpose of producing vaccines for prophylactic treatment and immunization. The bile has been found to reduce the virulence of the culture and even to produce strains of certain bacteria of lower virulence, so much so that such new strains are indicated in immunization treatment. So far as I am aware, however, neither bile nor the free acids thereof, nor any chemical combination thereof have ever been employed in therapeutics as internal germicides or viricides.

According to the present invention, compounds suitable for use as chemo-therapeutic agents, and particularly as internal germicides and viricides, are prepared from bile acids by combining the same with the various known aryl sulfonamide compounds having germicidal properties. These compounds may be designated as substituted amides of the bile acids; the bile acyl group being joined to an amino or rather imino group, which is either attached directly to the aryl nucleus, usually in the p-position to the sulfonamide group, or forms part of the sulfonamide group, or bile acid groups may be condensed with both amino groups of the amino-aryl-sulfonamides. Preferably, however, the bile acyl group is joined to the sulfonamide group. The remaining hydrogen of the sulfonamide group may be substituted by groups known to improve the germicidal action and/or reduce the toxicity of aryl sulfonamides; for example, pyridine, thiazol, thiodiazol, pyrimidine (diazine) and other aryl and heterocyclic groups.

The compounds of the present invention may be represented by the following general formula:

$$R.X.SO_2NR'(R'')$$

wherein R is preferably in the p-position to the sulfonamide group and represents a free amino group, groups containing a nuclearly bound nitrogen atom and convertible into an amino group, for example, a nitro group, or an acylamino group, for example, actylamino, benzoylamino, bile acyl amino, etc.; X indicates an aryl radical, such as pyridyl or phenyl, and preferably the latter; R' is hydrogen or a bile acyl group, at least one of R and R' being or containing a bile acyl group, and preferably R' when only one bile acyl group is present; while R'' is hydrogen or one of the known substituting groups in sulfanilamides, such as pyridyl, thiazol, thiodiazol, diazine, etc.

The new substances forming the subject matter of the present invention, aside from their chemical differences over known sulfanilamide preparations, have the following two important advantages over the known compounds which make them especially useful for the treatment of certain specific diseases. My new compounds, being characterized by both the sulfanilamide and bile acid radicals, possess the functions characteristic of both of these radicals; and have the further interesting property that the bile acid radical acts as a vehicle and directive for the sulfanilamide radical, so that the sulfanilamide compound is caused to act at a particular part of the body, specifically the liver and gall bladder, toward which the bile acid radical naturally tends to flow, irrespective of the point of administration of the chemo-therapeutic agent. It is known that the sulfanilamide compounds now in general use are eliminated through the kidney and that the rate of elimination is quite high, especially as these compounds represent totally foreign substances in the human organism. My new compounds, on the other hand, composed as they are in large part of a compound which is a normal component of the tissue of the liver and of the secretion of the liver, have a natural tendency to seek the liver for their normal mode of elimination from the blood stream. In other words, my new bile acid derivatives have a greater tendency to accumulate in the liver and the excretory channels of the liver than other germicides. For this reason, they are particularly suitable for the treatment of germ and virus diseases which attack the liver and the excretory ducts of the liver, for example, yellow fever and bacterial infections of the gall bladder and liver.

The compounds of the present invention have also the further advantage over known internal bactericides that they embody an agent, namely, the bile acid radical, which has a dissolving and disintegrating or dispersing action on lipoid substances. It is known that the outer wall or membrane of germs and, in fact, the whole substance of germs, are composed largely of lipoids or lipoid-like materials; thus, the tubercle bacillus is known to consist of about 30% of lipoids. For germs of this type, the compounds of the present invention appear to have a special affinity; for they are more readily able than the known sulfanilamide compounds to attack, disintegrate, and penetrate the outer wall and inner substance of the germs. In fact, it might be said that the compounds of the present invention have a greater "wetting" action on the exterior walls of germs of this type and therefore tend more readily to attack and disintegrate such germs. Upon breaching the outer walls and penetrating the interior of the body of the germs, the new compounds of the present invention carry with them the more potently bactericidal sulfanilamide preparation which completes the total destruction of the germs. The two radicals thus cooperate closely in initiating the attack on and causing the final disintegration of the germs, or leave the germs in a condition wherein they can be more readily attacked and finally killed by the defensive apparatus of the animal organism itself.

In their action on viruses, the compounds of the present invention intensify the viricidal action of the free bile acids. So far as I am aware, the known sulfanilamide compounds, while highly effective against various kinds of disease germs, have not yet been found to be adequately efficient in the treatment of virus diseases. My new compounds, therefore, open up a new field of therapy for sulfanilamide compounds; and the bile acid constituent of my new preparations points to their usefulness in the treatment of such virus diseases as yellow fever, typhus exanthematics, hydrophobia, and herpes. The new compounds are accordingly suitable for the treatment not only of those diseases for which the corresponding sulfanilamide compound itself has previously been used but also for virus diseases generally.

In addition to the diseases just mentioned, the tubercle bacillus appears to be peculiarly susceptible to attack by my improved sulfanilamide preparations. This is probably due to the fact, explained above, that the tubercle bacillus has an unusually high lipoid content, and my new compounds, for the reasons already given, have a special affinity for lipoid substances. In view of the similarity of behavior of other bacilli, such as the leprosy bacillus, to the tubercle bacillus, it is probable that my new compounds will be effective in the treatment also of leprosy and other bacilli diseases.

The compounds of the present invention, while generally effective also against all types of germs against which the known sulfanilamide preparations have been employed, are especially effective against different types of pneumococci, undoubtedly because of their bile acid radical.

While isolated individual bile acids are preferred in the production of the sulfonamide derivatives above described, mixtures of bile acids can also be used. The glyco- and tauro-acids, such as glycocholic and taurocholic acids may also be suitable for the production of internal germicides and where in the claims I speak of "bile acids" or "bile acyl" such expressions are to be understood as including also these naturally occurring derivatives of the cholanic acids.

The new series of aryl sulfonamide derivatives forming the subject matter of the present invention may be prepared by methods which are now well known and commonly employed for the manufacture of the known acyl derivatives of sulfanilamide. Thus, for example, cholyl chloride may be condensed with sulfanilamide, or cholic acid amide may be reacted with p-amino benzene sulfo-chloride in the presence of a base like pyridine, which fixes the liberated hydrochloric acid. The cholyl chloride can be prepared by the action of thionyl chloride on cholic acid. Where the bile acid contains alcoholic hydroxyl groups, as is the case with cholic, desoxycholic, and lithocholic acids, such groups may be protected against the action of the chlorinating agent in any suitable manner, as by treatment with formic acid, whereby the formyl derivatives are produced. (Cortese et al., Journal American Chemical Society, 57, 1393 (1935).) The hydroxyl groups may also be protected in any other way, as by acylation with acetic, propionic, etc. anhydrides, or chlorides, in known manner. After the formation of, for example, the formyl-cholyl chloride, the hydroxyl groups may be restored by hydrolysis. The cholyl chloride is now brought into reaction with, for example, sulfanilamide, in the presence of an acid-binding substance like pyridine, quinoline, or the like, thereby producing a cholic acid amide of sulfanilamide. Where the p-amino group is unsubstituted, the cholyl radical can attach itself to such group, or it can substitute in both of the amino groups. To insure the production of compounds having a free p-amino group, such group may be protected by being previously substituted by a group which can be readily split off by hydrolysis, such as an acetyl, propionyl, or other acyl group. After condensation of the cholyl chloride with the $N^4$-substituted, p-amino-benzene sulfonamide, the resulting product may be subjected to a mild hydrolytic treatment to restore the p-amino group. Or, if desired, a p-nitro-benzene sulfonamide, or other compound having in the p-position a group consisting nuclearly bound nitrogen and capable of conversion into an amino group, as by reduction, can be employed. After the condensation, the compound is then subjected to hydrogenation to reduce the p-substituent to the p-amino group. While the reactions have been described in connection with cholic acid, it will be understood that they are analogous in the case of the other bile and related cholanic acids, except that in the case of acids like dehydrocholic acid, where the hydroxyl groups are replaced by keto groups, no preliminary conversion to the formyl or equivalent compound will be necessary prior to reaction with the chlorinating agent.

The process may also be carried out by first forming, for example, cholic acid amide by reacting cholyl chloride with ammonia in known manner and thereafter condensing the amide with, for example, p-acetylamino benzene sulfochloride.

The reactions according to the invention are illustrated by the following:

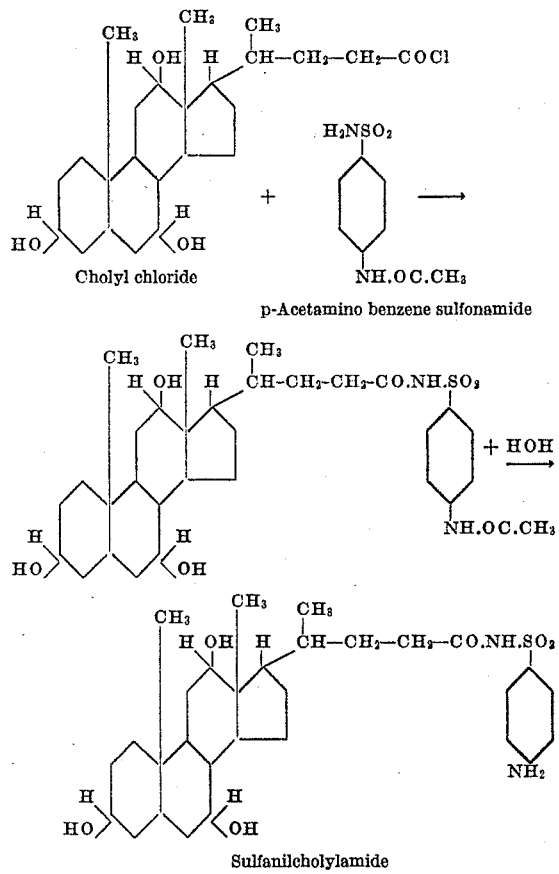

Cholyl chloride p-Acetamino benzene sulfonamide

Sulfanilcholylamide

In similar fashion, there can be produced sulfanildehydrocholylamide:

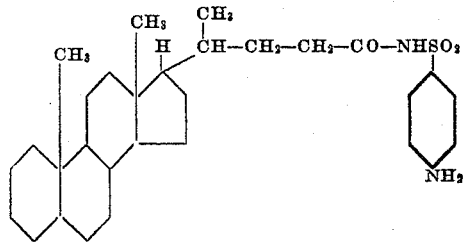

and the corresponding compounds of other bile and related acids.

The compounds of the present invention can be administered in the same way as the corresponding sulfanilamide compounds, that is, by mouth or intramuscularly. When injected, they may be prepared in the form of the known oily solution or suspensions. The dosage is equivalent to that of the corresponding sulfanilamide compound, that is, it may be based upon the administration of the same amount of the sulfanilamide radical; however, in view of the conjoint action of the bile acid radical, the dosage may be considerably less than equivalent to the corresponding sulfanilamide dosage.

Where the cholanyl compound contains alcoholic hydroxyl groups, as in the case of cholic and desoxycholic acids, they may be substituted in known manner by acyl groups such as acetyl, propionyl, etc., such substitution taking place either at the beginning of the process prior to the formation of the chloanyl chloride or after the sulfanilamide derivative has been produced. Where a free hydrogen atom is joined to the nitrogen of the sulfonamide group in the final product, it may be replaced by sodium, or other alkali metal, or by an alkaline earth metal, as by treatment with the corresponding hydroxide.

The invention will be further described and in greater detail by way of the following example which is presented purely for illustrative purposes:

*Example*

105 gms. of dehydrocholylchloride, $C_{24}H_{33}O_4Cl$, are reacted with about 62 gms. of p-acetamino benzene sulfonamide in 110 cc. of pyridine, the two reactants being preferably added in portions to the pyridine. The mixture is initially heated to a temperature of about 60 to 100° C. and during the course of the exothermic reaction, the temperature is kept at a value no higher than about 100° C. When the reaction is completed, which will take about an hour or more, depending upon the temperature employed, the reaction product is poured into dilute aqueous hydrochloric acid. There separates out an oily mass which can be made to crystallize. The product is treated with dilute sodium hydroxide solution and the latter is then acidified with hydrochloric acid to effect precipitation of the p-acetamino-benzene-sulfon-dehydrocholylamide. In order to saponify the acetamino group, the compound is heated in a suitable alkaline (dilute) solution in known manner until the p-amino group is restored. The final product is a white crystalline mass.

In similar fashion, the corresponding derivatives of cholic, desoxycholic, and other bile and related acids can be obtained.

The tertiary amine compounds referred to above, that is, the N'-bile acid derivativs of aryl sulfonamido-pyridine, pyrimidine, diazol, thiodiazol, and other heterocyclic derivatives can be prepared in similar fashion by reacting, for example, p-acetamino, benzene-sulfonamido-2-pyrimidine with, for example, dehydrocholylchloride or bromide, after which the $N^4$ acetyl group, and any bile acyl group that may have become attached to the $N^4$, is split off by hydrolysis.

I claim:

1. A p-amino-benzene-sulfonamide bile acyl, in which the bile acyl radical is present in the $N^1$ position of the sulfanilamide group.

2. p-amino-benzene-sulfondehydrocholylamide, the dehydrocholyl radical being present in the $N^1$ position of the sulfanilamide group.

ARPAD BERCZELLER.

REFERENCES CITED

The following references are of record in the file of this patent:

UNITED STATES PATENTS

| Number | Name | Date |
|---|---|---|
| 1,983,414 | Stoll | Dec. 4, 1934 |
| 2,292,575 | Loleib | Aug. 11, 1942 |

OTHER REFERENCES

Schmidt et al.: "Am. Jour. Digestive Diseases," vol. 5, (1939), p. 615.

Crossley: "Jour. Am. Chem. Soc.," vol. 61, pp. 2950–2955 (1939).